INVENTOR.
MEYER MARON
BY Darby & Darby
ATTORNEYS

INVENTOR.
MEYER MARON

BY Darby + Darby

ATTORNEYS

United States Patent Office 3,088,050
Patented Apr. 30, 1963

3,088,050
SYNCHRONIZATION OF ELECTRONICALLY SWITCHED DISPLAYS

Meyer Maron, East Paterson, N.J., assignor to Fairchild Camera and Instrument Corporation, Syosset, N.Y., a corporation of Delaware Filed Oct. 25, 1960, Ser. No. 64,952
12 Claims. (Cl. 315—26)

This invention relates to an improved synchronizing circuit for alternate time shared displays presented on an oscilloscope screen wherein the display signals are caused to alternate by means of electronic switching circuits. One form of switching circuit has been described in some detail in my copending application entitled Dual Electronic Switch Symmetrically Located in Delay Line, Serial No. 64,370, assigned to the same assignee as the instant application, wherein rectangular switching waves cause a time sharing electronic switch to apply either one or the other of two display waveforms alternately to the vertical deflection system of a cathode ray oscilloscope.

The details of synchronization between a display waveform and the said switching waves are not disclosed, however, in the above mentioned application. One form of synchronizing system was discussed briefly but not described in detail in another copending application by Bernard L. Hegeman entitled Direct Readout System for Oscilloscopes, Serial No. 34,124, filed June 6, 1960, assigned also to the same assignee.

Known synchronizing methods for sweep waves to make possible the observation of signals from electronic time sharing switches used to apply alternate displays to deflecting systems are subject to a serious defect. When a low frequency calibrating wave is time shared with a high frequency display waveform on an oscilloscope screen, the calibrating wave slopes may trigger the sweep circuits. Such trigger action causes only the top or bottom of the calibrating waves to appear on the scope, rather than the top and the bottom, both of which are needed to make an amplitude measurement. This is particularly true when the synchronizing signal is derived or taken off from the amplified output of the time sharing switch which includes both display waves and calibrating waves, alternately.

Accordingly, it is a prime object of my invention to provide an improved synchronizing system for use with time sharing switches when one of the alternate time shared displays is a calibrating wave.

It is another object of my invention to provide a time shared display in which dot readout calibration is utilized and in which both dots are visible for measuring a display even when the display frequency is higher than the calibrating frequency.

It is still another object to provide such a dot readout display in which the intensity of the dots is synchronized with the display and is controlled through a time shared intensity gate.

It is still another object of my invention to provide a high frequency time shared display in which the top and the bottom of a low frequency calibrating wave are both visible on the display screen.

Figure 1:
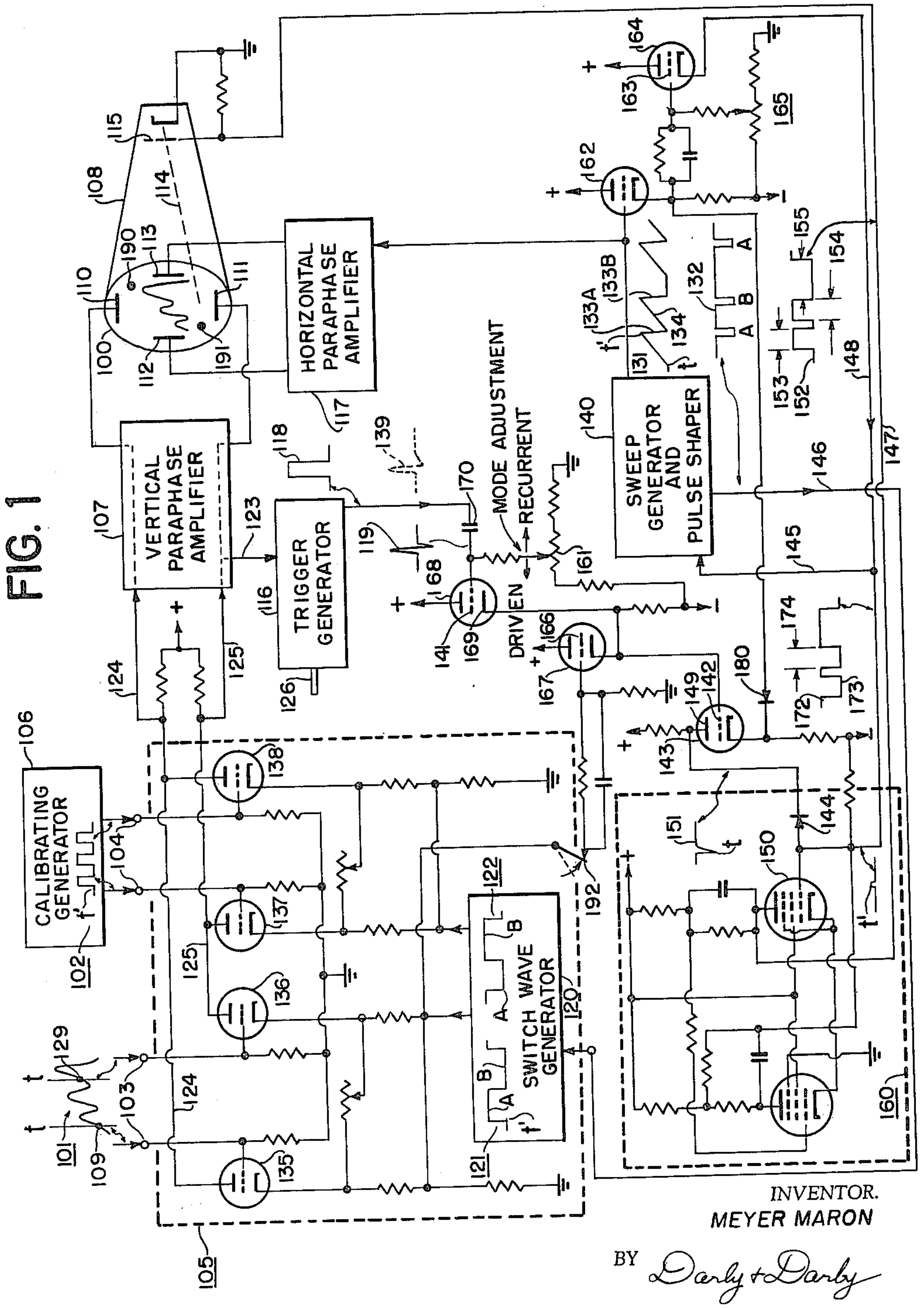

Other objects of this invention will become apparent to those skilled in the art when considered in respect to a description of the annexed drawings in which, FIGURE 1 is a schematic diagram of a preferred embodiment of the invention; and FIGURES 2*a* through 2*k* illustrate the time relations of the waveforms shown in FIGURE 1.

Referring now to FIGURE 1, electrical signals having a waveform 101 are to have their amplitude compared to the amplitude of a calibrating square wave 102. Signal waves 101 and square waves 102 are applied to input terminal pairs 103 and 104, respectively. In this preferred embodiment these are push-pull terminal pairs which are part of a time sharing switch having a circuit as shown in the dotted box 105.

The time shared signal waves and calibrating waves are switched through push-pull pairs of tubes 135, 136 and 137, 138 by switch waves 121, 122 (FIGURE 1 and FIGURES 2*j* and 2*k*), respectively. Alternate pairs of push-pull potential waves having the forms 101 or 102 alternately appear on push-pull output conductors 124 and 125. These alternate push-pull waves are amplified by amplifier 107 and are applied to deflection plates 110, 111, alternately. Sweep waves applied to horizontal deflection plates 112, 113 cause signal waves 101 and selected portions 200, 201 (FIGURES 1 and 2*a*) of calibrating waves 102 to appear in time shared sequence on tube face 100 of cathode ray tube 108, as shown in FIGURE 1. Thus, the signal wave amplitudes can be compared with the amplitude of the calibrating waves for quantitative measurement, either with the wave top 200 and wave bottom 201; or with dots 190, 191 when the calibrating waves are used as dot producing waves as described in the above-mentioned copending application Serial No. 34,124.

In prior art, when the display wave was of relatively high frequency with respect to the calibrating wave, for example, more than twice the frequency, so that the sweep wave speed setting was so high that a sweep wave was completed in less than a half period of the calibrating wave, a difficulty occurred. The calibrating wave would trigger the sweep wave so that only one portion, either 200 or 201, would always be selected for presentation in time shared sequence with the display wave and thus no amplitude measurement could be made of the display wave. My invention allows both portions 200 and 201 of the calibrating wave to be selected under all conditions.

In the preferred embodiment of my invention, the portions 200, 201 are selected by means of a trigger generator 116, which through an output conductor 123 of amplifier 107 has the signal waves and calibrating waves, as they occur alternately on conductor 125, applied to it.

The trigger generator 116 may contain a circuit such as the well known Schmitt trigger generator circuit. This may be arranged to generate a positive sync pulse 118 (FIGURES 1 and 2*c*) starting in coincidence with a desired time *t* at a point such as 109 of the display waveform 101. Wherever the point 109 occurs, this being controlled by the trigger control shaft 126, the sync pulse 118 occurs coincidentally therewith and can be (and usually is) used to synchronize a sweep generator such as 140, as will be described later.

The primary function of the sweep generator 140 is to generate a linear sawtooth voltage sweep wave 131 for application to the horizontal paraphase amplifier 117. After wave 131 starting at time *t* has been converted to a push-pull wave and amplified in 117, the amplified deflection waves are applied to deflection plates 112, 113, to display the waveform 101 on tube face 100.

Figures 2A, 2B, 2C, 2D, 2E, 2F, 2G, 2H, 2I, 2J, 2K:
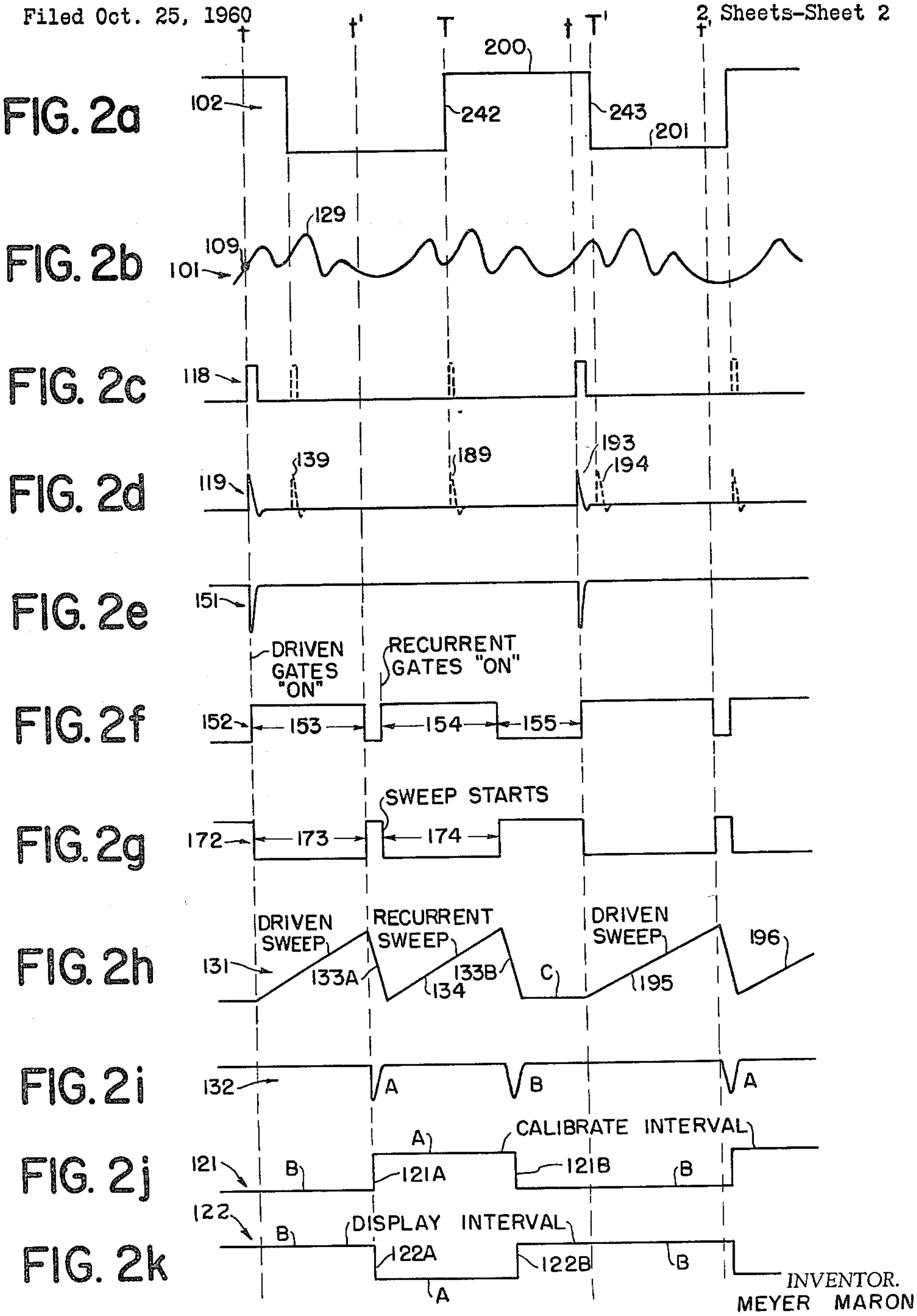

In this preferred embodiment of my invention, sweep generator 140 is arranged to produce a negative synchronizing pulse wave 132, the pulses occurring synchronously with a steep slope such as 133A or 133B of wave 131, just after 131 reaches maximum amplitude at the end of each sweep. The time relations are shown in FIGURES 2*h* and 2*i*. These relations may be obtained by differentiating circuitry which is well known in the art.

The sync pulses 132 are applied to conductor 146 and are utilized to synchronize the switch wave generator 120 which is a generator of rectangular waves, and is preferably of the well known bistable multivibrator type, producing the two output waves 121, 122 which are 180° out of phase. In a bistable multivibrator, if sync pulse 132A occurs at time *t'*, (designated by point 129 on 101), it will initiate at that time the positive potential excursion 121A of wave 121, and the negative potential excursion 122A of wave 122, FIGURES 2*j* and 2*k*.

As is well known, the next following sync pulse 132B applied to generator 120 will initiate a negative potential excursion such as 121B, and a positive excursion 122B. Excursions 121A, 121B will be coincidental with the symmetrical out-of-phase excursions 122A, 122B, respectively.

Sweep 131 is used to display the signal wave 101 on tube face 100, starting at time *t* and ending at time *t'*, these times being included in the interval designated B. The switch wave interval A following 121A starts at time *t'*, triggered by 132A, and drives cathodes 135, 136 of the dual electronic switch 105 to a positive potential. Thus, the tubes 135, 136 are cut off during the interval starting at 121A. During this same interval the cathodes of tubes 137, 138 are driven to a negative potential, and these tubes will conduct. Thus, the calibrating square wave 102 is applied to the vertical deflecting plates 110, 111 during the interval A in place of the display wave 101 applied during the switch wave interval B.

The synchronization of sweep generator 140 will now be described in detail. The trigger pulse 118 is differentiated by a small capacitor 170 (FIGURE 1) connected to the mode adjustment circuit 161. The differentiated pulse 119 is applied to grid 141 of tube 168, together with a D.C. bias from the mode adjustment circuit 161. If the D.C. bias is adjusted to be of maximum negative value, as in the position indicated as "driven" in FIGURE 1, this bias is transferred via cathode 169 to grid 142 of tube 143 and reduces the current in amplifier 143 and makes the anode 149 so positive that diode 144 is not conductive, its cathode being more positive than its anode.

In this "driven" mode, a negative pulse which will override the positive bias just described is required on the cathode of diode 144 to drive the grid of tube 150 of gate generator 160 to generate a negative gate pulse 173. This overriding negative pulse 151 is produced at anode 149 of tube 143 by the positive trigger pulse 119 and makes diode 144 conductive for a brief time.

During this brief time the grid of tube 150 of the multivibrator gate generator 160 causes a negative gate pulse 173 to appear on conductor 145 and a positive gate or brightening pulse 153 to appear on output conductor 147. The negative gate pulse 173 initiates sweep wave 131 at time *t*, the sweep wave rising linearly in potential toward a maximum value occurring at time *t'*. Simultaneously, pulse 153 is applied to grid 115 of cathode ray tube 108 to intensify the beam 114.

The peak rise of sweep wave 131 is transferred through cathode follower 162 to grid 163 of cathode follower 164. Adjustment of potentiometer 165 determines the time *t'* at which the amplitude of 131 is sufficient to cause current to flow in tube 164 and to drive conductor 148 positive. Since conductor 148 is connected to the grid of tube 150, the negative gate 173 will be terminated at time *t'* and the sweep collapse 133A will occur, thus producing the switch wave sync pulse 132A, and switching off display wave 101 from the V-deflection plates at time *t'*. When operating in the "driven" mode, after time *t'* there will be no sweep generated until a trigger pulse is generated. If, on the other hand, the mode adjustment bias control 161 is set for operation in the "recurrent" mode, no trigger pulse is required to start a second sweep. In this case a second or "recurrent" gate follows the collapse of the preceding sweep immediately and initiates a second sweep that is not synchronized to anything except the end of the preceding sweep.

If the sweep is faster than the half period of a calibrating wave, as shown in FIGURES 2*a* and 2*b*, and if the calibrating wave is allowed to trigger the sweep as at time T or Time T', on a slope such at 242 or 243, it can be seen that only a portion of the flat top 200 or the flat bottom 201 of the calibrating wave would appear in the oscilloscope display on faceplate 100, whereas parts of both the top and the bottom are necessary in order to utilize the calibrating wave. This situation would occur because the sweep wave endures for less time than is required to include at least a part of both the top and bottom of the calibrating wave, thus displaying only the top or bottom, and always the one or the other, i.e., either the top or the bottom, depending on whether the Schmitt trigger is adjusted for the plus slope 242 or the minus slope 243.

My invention overcomes the disadvantage, indicated above, by causing the brightening gate and sweep to recur at a rate which is nonsynchronous with respect to the calibrating wave. Since, as explained above, the sweep wave 131 is synchronized from the display wave 101 as at point 109 of FIG. 2*b*, the calibrating wave also has a frequency which is nonsynchronous relative to the display wave. When the calibrating waves are dot producing waves (as described in the above-mentioned copending application, Serial No. 34,124), the disadvantage mentioned manifests itself in that only one dot would appear on the display if the steep slopes of the dot producing waves caused triggering of the sweep wave and brightening wave in synchronism therewith. Again, by causing random rate, my invention overcomes the disadvantage and causes both dots to be present.

When operating in the "driven" mode, in the absence of a trigger pulse there will occur a "dead time" during which no sweep is generated. Nothing would then happen until a new trigger pulse, such as 139 or 189 (FIGURE 2*d*) was generated in trigger generator 116; or until the mode adjustment was manually set in the automatic position indicated as "recurrent" (FIGURE 1). In such case, grid 142 would become more positive, anode 149 would become more negative, diode 144 would conduct and cause grid of tube 150 to go negative, thus automatically initiating a new negative gate 174 and a new sweep 134 immediately following the preceding sweep.

In my invention the gate mode and sweep mode are made alternately "driven" for trigger operation and "recurrent" for automatic operation, by closing switch 192, for example. Then there is no "dead time" immediately following a "driven" sweep cycle during which the sweep "waits" for a steep slope such as 242 of the calibrating wave 102 (FIGURE 2*a*) to retrigger it at time T. This action provides twice as many sweep cycles of signal and twice as many sweep cycles of readout in any given time interval as would be possible without this feature. This therefore provides a readout for a single transient. By closing switch 192, switch wave 121 is applied to grid 166 of cathode follower 167, the cathode of which is in parallel with the cathode 169 of cathode follower 168.

At the end of the driven sweep wave cycle 131, which occurs at time *t'*, the pulse 132A initiates a positive excursion 121A of the switch wave 121 which causes a large positive voltage to appear on grid 166 and a large negative voltage to appear on the cathode of diode 144. This has the same effect as though mode adjustment 161 was manually placed in the recurrent mode or automatic position, making grid 141 more positive. Gate generator 160 will thus initiate a positive gate 154 on conductor 147, and a negative gate 174 on conductor 145 to start the generation of a sweep wave 134 immediately following the sweep 131 collapse 133A. Thus, sweep 134 will occur nonsynchronously with respect to a steep edge 242 of the calibrating wave 102. The calibrating wave may be frequency modulated to increase the nonsynchronous character of this occurrence, as described in the above-mentioned copending application Serial No. 34,124.

At the end of the automatic sweep wave cycle 134, the pulse 132B, derived from sweep wave collapse 133B, will start negative excursion 121B of the switching wave 121. Thus, grid 166 is driven negative for an interval B, which action affects the gate generator 160 just as though the mode adjustment 161 had been manually placed in the driven mode or trigger operated position. A "dead time" C will then occur in the sweep generator until the next following trigger pulse 193 or 194 occurs in trigger generator 166 and initiates a driven sweep 195 similar to 131. It can be seen that triggered and automatic sweep pairs, such as 131, 134 and 195, 196 will be generated automatically by application of the switch wave 121 to grid 166.

If occasionally a trigger such as 194, due to a calibrating wave slope, occurs ahead of a desired trigger, such as 193, so that only the bottom 201 of the calibrating wave 102 appears in the display on faceplate 100, this will not prevent the top 200 from appearing part of the time in a random fashion; i.e., whenever a desired trigger occurs first.

In order to prevent double triggering in the driven mode, for example by a pulse such as 139 occurring after a sweep has been initiated, a lockout diode 180 is provided. Cathode follower 162 applies a rising positive sweep voltage to the cathode of the gate driving tube 143. This renders tube 143 inoperative on spurious triggers, such as 139, which might occur before the sweep has been completed, at the amplitude determined by the gate turn-off adjustment 165.

A method of producing display waves and calibrating waves in time shared sequence has been described wherein the display wave and the sweep are synchronous in time and the calibrating wave occurs randomly in time. Since various modifications of my method are possible, I wish to be limited not by the foregoing description but solely by the claims granted to me.

What is claimed is:

1. In a cathode ray oscilloscope having a cathode ray tube with a single electron beam and including a time-sharing switch for displaying alternately a signal wave and a calibrating wave nonsynchronous therewith, in combination: a sweep generator providing a time base for the displays, means to trigger said sweep generator at a selected time relative to a signal wave to produce a single sweep of the electron beam while the time-sharing switch is in a signal wave display position, and means operable on completion of said single sweep to actuate the time-sharing switch to a calibrating wave display position and to initiate a second sweep nonsynchronous with the calibrating wave.

2. In a cathode ray oscilloscope having a cathode ray tube with intensity control of a single electron beam and including a time-sharing switch for displaying alternately a signal wave and a calibrating wave nonsynchronous therewith, in combination: a sweep generator providing a time base for the displays, means to trigger said sweep generator at a selected time relative to a signal wave to produce a single sweep of the electron beam while the time-sharing switch is in a signal wave display position, means operable on completion of said single sweep to actuate the time-sharing switch to a calibrating wave display position and to initiate a second sweep nonsynchronous with the calibrating sweep, and means to apply brightening pulses to the intensity control of said electron beam corresponding in time with said single and said second sweeps.

3. In electronic apparatus for producing a visual two-dimensional display of signal waves and calibrating waves on alternate sweeps, in combination: means to derive an electric pulse at a predetermined time corresponding to a selected point on the signal waves; a sweep generator; means operated by said pulse to start said sweep generator; means operated by said sweep generator to terminate operation thereof after a single sweep; and means responsive to said termination to restart said sweep generator to produce a second single sweep.

4. In a cathode ray oscilloscope having a cathode ray tube with a single electron beam, and including a time-sharing switch operable by switching waves for alternately applying display waves and calibrating waves to deflect the beam in one dimension, in combination: means to produce a trigger signal at a time corresponding to a predetermined point on a display wave; means operated by said trigger signal to produce a pulse responsive to said trigger; means operated by a switching wave to produce a pulse automatically; a sweep generator for deflecting the electron beam in another dimension; means to synchronize said sweep generator with said pulses; means to generate switching waves; means operated by said sweep generator to synchronize said switching waves; and means to apply said switching waves to operate the time-sharing switch and said pulse generator to produce triggered pulses and automatic pulses alternately.

5. In a cathode ray tube oscilloscope having a cathode ray tube with a single electron beam, the oscilloscope including a time-sharing switch operable by switcing waves for alternately applying display waves and calibrating waves to deflect the beam in one dimension; in combination, means to produce a trigger signal at a time corresponding to a predetermined point on a display wave, means to generate the switching waves, means operable in response to said trigger signal when said switching wave generator is in a first state to generate a control pulse, a sweep generator for deflecting the beam in another dimension, means operable in response to said control pulse to initiate operation of said sweep generator to produce a single sweep, and means operable upon termination of said single sweep to cause said switching wave generator to switch to a second state and render said response means non-responsive to a trigger signal and ineffective to produce a control pulse.

6. In a cathode ray oscilloscope having a cathode ray tube with a single electron beam, the oscilloscope including a time-sharing switch operable by switching waves for alternately applying display waves and calibrating waves to deffect the beam in one dimension; in combination, means to produce a trigger signal at a time corresponding to a predetermined point on a display wave, means to generate the switching waves, means operable in response to said trigger signal when said switching wave generator is in a first state to generate a control pulse, a sweep generator for deflecting the beam in another dimension, means operable in response to said control pulse to initiate operation of said sweep generator to produce a single sweep while the display is deflecting the beam in the one dimension, and means operable upon termination of said single sweep to cause said switching wave generator to switch to a second state and render said response means non-responsive to a trigger signal and ineffective to produce a control pulse.

7. In a cathode ray oscilloscope having a cathode ray tube with a single electron beam, the oscilloscope including a time-sharing switch operable by switching waves for alternately applying display waves and calibrating waves to deflect the beam in one dimension; in combination, means to produce a trigger signal at a time corresponding to a predetermined point on a display wave, means to generate the switching waves, means operable in response to said trigger signal when said switching wave generator is in a first state to generate a control pulse, a sweep generator for deflecting the beam in another dimension, means operable in response to said control pulse to initiate operation of said sweep generator to produce a single sweep, means operable upon termination of said single sweep to cause said switching wave generator to switch to a second state and render said response means non-responsive to a trigger signal and ineffective to produce a control pulse, and means operable automatically when said switching wave generator is in said second state to produce a control pulse to initiate a second period of operation of said sweep generator to thereby produce a second sweep immediately following said first sweep.

8. In a cathode ray oscilloscope having a cathode ray tube with a single electron beam, the oscilloscope including a time-sharing switch operable by switching waves for alternately applying display waves and calibrating waves to deflect the beam in one dimension, in combination, means to produce a trigger signal at a time corresponding to a predetermined point on a display wave, means to generate the switching waves, means operable in response to said trigger signal when said switching wave generator is in a first state to generate a control pulse, a sweep generator for deflecting the beam in another dimension, means operable in response to said control pulse to initiate operation of said sweep generator to produce a single sweep while the display wave is deflecting the beam in the one dimension, means operable upon termination of said single sweep to cause said switching wave generator to switch to a second state and render said response means non-responsive to a trigger signal and ineffective to produce a control pulse, and means operable automatically when said switching wave generator is in said second state to produce a control pulse to initiate a second period of operation of said sweep generator to thereby produce a second sweep immediately following said first sweep while the calibrating wave is deflecting the beam in the one dimension.

9. In a cathode ray oscilloscope having a cathode ray tube with a single electron beam, the oscilloscope including a time-sharing switch operable by switching waves for alternately applying display waves and calibrating waves to deflect the beam in one dimension, in combination, means to produce a trigger signal at a time corresponding to a predetermined point on a display wave, means to generate the switching waves, means operable in response to said trigger signal when said switching wave generator is in a first state to generate a first control pulse, a sweep generator for deflecting the beam in another dimension, means operable in response to said control pulse to initiate operation of said sweep generator to produce a single sweep, means operable upon termination of said single sweep to cause said switching wave generator to switch to a second state and render said response means non-responsive to a trigger signal and ineffective to produce a control pulse, means operable automatically when said switching wave generator is in said second state to produce a second control pulse to initiate a second period of operation of said sweep generator to thereby produce a second sweep immediately following said first sweep, and means operable in response to termination of said second sweep for returning said switching wave generator to said first state.

10. In a cathode ray oscilloscope having a cathode ray tube with a single electron beam producing gun including a control grid, the oscilloscope including a time-sharing switch operable by switching waves for alternately applying display waves and calibrating waves to deflect the beam in one dimension, in combination, means to produce a trigger signal at a time corresponding to a predetermined point on a display wave, means to generate the switching waves, means operable in response to said trigger signal when said switching wave generator is in a first state to generate a first control pulse, a sweep generator for deflecting the beam in another dimension, means operable in response to said control pulse to initiate operation of said sweep generator to produce a single sweep, means operable upon termination of said single sweep to cause said switching wave generator to switch to a second state and render said response means non-responsive to a trigger signal and ineffective to produce a control pulse, means operable automatically when said switching wave generator is in said second state to produce a second control pulse to initiate a second period of operation of said sweep generator to thereby produce a second sweep immediately following said first sweep, means operable in response to termination of said second sweep for returning said switching wave generator to said first state, and means for applying said first and second control pulses to the control grid of the cathode ray tube to intensify the electron beam.

11. In a cathode ray oscilloscope having a cathode ray tube with a single electron beam, and including two time-sharing switches operated by switching waves, one for alternately applying display waves and calibrating waves to deflect the beam in one dimension, the other for applying alternately occurring sweep waves to deflect the beam in a second dimension, in combination; means to produce a trigger signal at a time corresponding to a predetermined point on a display wave; a pulse generator; means to switch said pulse generator in two states to produce triggered pulse waves in a first state and to produce automatic pulse waves in a second state; a generator of sweep waves; means to initiate operation of said sweep wave generator in response to said pulse waves; means to generate switching waves; means to initiate said switching waves upon termination of said sweep waves; and means to apply said switching waves to operate the two time-sharing switches and said pulse generator simultaneously thereby to produce said triggered pulse waves and said automatic pulse waves, alternately, in correspondence with the display waves and the calibrating waves.

12. In a cathode ray oscilloscope having a cathode ray tube with a grid to control the intensity of a single electron beam on a display screen, and including two time-sharing switches, one operated alternately by a first switch wave for applying signal waves of a particular frequency and by a second switch wave for applying a calibrating rectangular wave of a lower frequency to deflect the beam in one dimension, and the other operated alternately by the first switch wave for applying a sweep wave and by the second switch wave for applying a calibrating rectangular wave to deflect the beam in another dimension, in combination; means to produce a trigger signal at a time corresponding to a selected point on a signal wave; means to generate brightening pulses; means to switch said pulse generator to a first state to produce pulses synchronized with said trigger signals and alternately to a second state to produce pulses automatically; means to apply said brightening pulses to the control grid to intensify said beam; means to generate sweep waves; means to generate first and second switch waves; means to synchronize said sweep waves to start at the beginning of each said brightening pulse and to synchronize said switch waves to start at the end of each said sweep; means to cause said first switch wave to switch the one time-sharing switch to apply said signal wave to deflect said beam in one dimension and to alternately cause said second switch wave to switch said one time-sharing switch to apply said calibrating wave to deflect the beam in said one dimension; and means to cause said first switch wave to switch the other time-sharing switch to apply said sweep wave to deflect said beam in the other dimension and to alternately cause said second switch wave to switch said other time-sharing switch to apply said calibrating wave to deflect said beam in said other dimension to thereby produce brightened signal waves and calibrating dots alternately on the display screen.

References Cited in the file of this patent

UNITED STATES PATENTS 2,680,210 Miller et al. ------------- June 1, 1954